Oct. 30, 1928.  F. B. ROOT  1,689,892

WRINKLING FINISH

Filed July 13, 1928

Inventor
Frank B. Root,
By Pennie, Davis, Marvin and Edmonds.
Attorney

Patented Oct. 30, 1928.

1,689,892

UNITED STATES PATENT OFFICE.

FRANK BRIAN ROOT, OF NEWARK, NEW JERSEY, ASSIGNOR TO FLOOD & CONKLIN COMPANY, OF NEWARK, NEW JERSEY, A CORPORATION OF NEW JERSEY.

WRINKLING FINISH.

Application filed July 13, 1928. Serial No. 292,333.

This invention relates to improvements in varnishes and enamels and in the application of varnishes and enamels for the production of wrinkled finishes. The invention includes improved varnish and enamel products and an improved method of producing such finishes.

The following example illustrates the improved composition of the invention, and is a particularly advantageous embodiment of the invention.

- 25 lbs. Congo.
- 1¼ lbs. rosin.
- 7 ozs. red lead.
- 3 ozs. borate of manganese.
- ⅝ gal. China wood oil.
- 1⅝ gals. blown wood oil.
- 5¾ gals. toluol.

In the foregoing example the ratio of the oil to the resins is about 9 gals. of oil per 100 lbs. of resin.

When the surface is coated with a varnish of this composition and exposed to drying conditions, advantageously at elevated temperatures, a wrinkled finish of pleasing and attractive appearance results. The wrinkling seems to be due to rapid oxidation of the surface of the applied film forming a skin over the less oxidized material on the interior of the film, the surface skin increasing in volume and expanding laterally and the less oxidized material on the interior of the film being of lower viscosity, flowing into the fold produced by expansion of the surface skin. The general effect is that of a level surface broken up by ridges projecting from and running irregularly over the surface.

Figure 1:
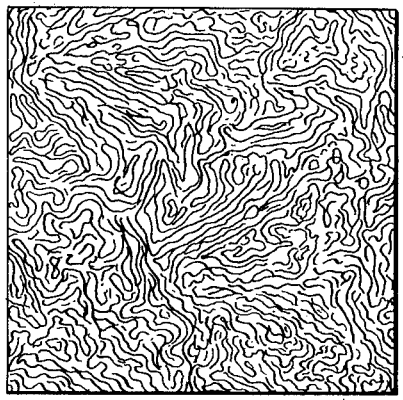
Figure 2:

The accompanying drawings illustrate enlargements of the improved finish provided by the invention:

Fig. 1 showing the surface of the finish and Fig. 2 a section through the finish.

There are a number of factors which affect the exact character of the improved finish of the invention. These include the temperature of drying, the kind of oil and the kind of resin used, the ratio of resin to oil, the volatility of the thinner used, and the thickness of the applied film.

Apparently, the most important characteristic of the oil used is the speed with which it oxidizes. Blown linseed oil, for example, is better than raw linseed oil, but both give but very weak effects and these only in films that are quite thick. Perilla oil produces varnishes and enamels which exhibit some wrinkling when dried under suitable conditions, and the same is true of raw China wood oil.

However, varnishes and enamels made from China wood oil which has been partially oxidized or pre-oxidized, as by blowing air through the heated oil, can be made to produce pronounced wrinkling effects which seem to be characteristic of oxidized or pre-oxidized China wood oil. Varnishes and enamels can be made from such oxidized or pre-oxidized China wood oil which dry superficially very rapidly, the film beneath the dry surface skin remaining fluid, with resulting expansion of the surface skin and the formation or wrinkles.

The China wood oil may, with advantage, be oxidized or pre-oxidized in the following manner:

A 1½ inch brass pipe is bent into an open ring with an upright stem, the ring being large enough to fit conveniently into and lie upon the bottom of a 150-gallon varnish kettle. Closely spaced ⅛ inch holes are drilled into the pipe ring to allow for the introduction or air. One hundred gallons of raw China wood oil are placed in the kettle, heated to 260° F. and maintained at this temperature while a vigorous stream of air is blown through the oil for a period of about eight hours.

The resins useful in the composition of the invention and in carrying out the invention include Congo, kauri, damar, Cumar, Pontianak, manila, Zanzibar, elemi, mastic, the oil soluble formaldehyde-phenolic resins, the oil soluble glycerol-phthalic anhydride condensation products, paracoumarone, Congo ester, manila ester, rosin ester and mixtures of these resins. The resins and their equivalents, just enumerated, when used in the proportions and in the manner described in the specification, may be referred to as "wrinkled finish resins" and where the term "wrinkle finish resins" is hereafter employed it is intended to refer to these resins. Pyroxylin, nitrocellulose, gilsonite and rosin apparently tend to inhibit the wrinkling action; in small amounts they cause very fine wrinkles and in large amounts may eliminate wrinkling. Rosin, if used in large amount, also tends to produce irregularities in the size and in the interval between wrinkles in the resulting finish.

Although a wrinkle finish can be secured over a considerable range of ratios between resin and oil, best results are secured over a somewhat limited range. If the proportion of oil with reference to the proportion of resin is too large, the wrinkling may be so vigorous as to cause breaks and marked unevenness in the surface. If the proportion of oil with reference to the proportion of resin is too small, wrinkles may fail to develop, even if the finish is dried at elevated temperatures. The following example illustrates a composition which wrinkles satisfactorily:

25 lbs. Congo.
1¼ lbs. rosin.
7 ozs. red lead.
3 ozs. borate of manganese.
⅝ gals. China wood oil.
1¼ gals. blown wood oil.
5½ gals. light naphtha.
1¼ gals. toluol.

In the above example the ratio of the oils to the resins is about 7.5 gals. of oil per 100 lbs. of resin. With this low, or a lower, ratio between oil and resin a tendency toward brittleness may result. The following example illustrates a composition which wrinkles satisfactorily and quite evenly:

25 lbs. Congo.
1¼ lbs. rosin.
7 ozs. red lead.
3 ozs. borate of manganese.
⅝ gals. China wood oil
2⅜ gals. blown wood oil.
8 gals. toluol.

In the composition of the above example the oils are present in the ratio of about 12 gals. of oil per 100 lbs. of resin.

The following example illustrates a composition of high ratio between oil and resin:

25 lbs. Congo.
1¼ lbs. rosin.
7 ozs. red lead.
3 ozs. borate of manganese.
⅝ gal. China wood oil.
3¾ gals. blown wood oil.
7 gals. toluol.

With this high (about 17 gals. of oil per 100 lbs. of resin), or a higher, ratio between oil and resin, a tendency toward roughness and irregularity may result.

Within limits, the exact character of the improved finish of the invention can be controlled by regulation of the viscosity of the varnish or enamel composition, for example, by adjusting the quantity and character of thinner used, and by adjusting the degree of oxidation of the oxidized or pre-oxidized China wood oil used.

It is advantageous to use thinners that are low-boiling and quite volatile; it is advantageous to use thinners, for example, the major portions of which boil off below about 325° F. The thinner used may be a mixture of several thinning components. A low-boiling thinner evaporates more quickly from the varnish or enamel film, promotes the rapid formation of a surface skin, and during drying assists in maintaining a greater differential between the degree of oxidation of the surface skin and the oil within the film. Where the finish is dried at elevated temperatures, the use of low-boiling thinners also assists in eliminating any tendency towards sagging of the finish during the drying operation. The following example, in which the oils are present to the extent of about 9 gals. per 100 lbs. of resin, illustrates a composition containing a relatively high-boiling thinner:

25 lbs. Congo.
1¼ lbs. rosin.
7 ozs. red lead.
3 ozs. borate of manganese.
⅝ gal. China wood oil
1⅝ gals. blown wood oil.
1¾ gals. turpentine.
4¾ gals. heavy naphtha.
¾ gal. light naphtha.

Applied in thin films, the wrinkles produced with this composition are quite fine. More pronounced wrinkles are produced with compositions containing lower-boiling thinners. The following example (in which the oils are present to the extent of about 9 gals. per 100 lbs. of resin) illustrates a composition containing a lower-boiling thinner:

25 lbs. Congo.
1¼ lbs. rosin.
7 ozs. red lead.
3 ozs. borate of manganese.
⅝ gal. China wood oil.
1⅝ gals. blown wood oil.
6 gals. light naphtha.
1¼ gals. toluol.

In place of the light naphtha and toluol in the foregoing example, 5¾ gals. of toluol may be substituted, illustrating another composition containing a low-boiling thinner.

In producing the improved wrinkled finish of the invention, it is advantageous to dry the applied finish of varnish or enamel at an elevated temperature; advantageously a temperature upwards of 150° F. At elevated temperatures rapid oxidation of the surface of the applied film is promoted and any tendency toward diffusion of oxidation products from the surface into the interior of the film is lessened. In general, drying at elevated temperatures accentuates the wrinkling and assists in providing a harder finish. As an illustration of drying times and temperatures, satisfactory wrinkled finishes are obtained with the composition given in the first example herein in five hours at 180° F., in three hours at 200° F., in two hours at 250° F., in one and one-half hours at 300° F. and in three-fourths hours at 400° F. Drying at elevated temperatures also assists in making the finish resistant to the action of the usual solvents employed in pyroxylin lacquers and enamel.

The exact character of the finish is also affected by the thickness of the applied film; thinner films give finer wrinkles and thicker films coarser wrinkles.

The improved finishing composition of the present invention can be applied as a clear varnish or as a pigmented enamel. Such enamels can be prepared by mixing with the clear varnish composition a pigment paste ground in a varnish or a gum solution. Due to change in the pigment or to darkening of the varnish some colors do not give entirely satisfactory results when dried at elevated temperatures. In such cases, a clear varnish coat can be applied, or a coat of varnish to which a small amount of pigment paste has been added to tint it and to facilitate application to dark surfaces, this coat dried at an elevated temperature, and one or more color coats of pyroxylin lacquer enamels or baking Japans applied. The improved varnish and enamel compositions of the invention are of general application as under coats where a wrinkled finish is desired.

The present application is a continuation in part of my application Serial Number 194,201 filed May 25, 1927.

I claim:

1. An improved varnish or enamel composition for producing wrinkled finishes comprising China wood oil and a wrinkle finish resin in proportions not less than about seven and not more than about seventeen gallons of oil per hundred pounds of the resin, at least the major portion of said oil being pre-oxidized by blowing, a drier and a thinner.

2. An improved varnish or enamel composition for producing wrinkled finishes comprising China wood oil and a wrinkle finish resin in proportions not less than about seven and not more than about twelve gallons of oil per hundred pounds of the resin, at least the major portion of said oil being pre-oxidized by blowing, a drier and a thinner.

3. An improved varnish or enamel composition for producing wrinkled finishes comprising China wood oil and a wrinkle finish resin in proportions not less than about seven and not more than about seventeen gallons of oil per hundred pounds of the resin, at least the major portion of said oil being pre-oxidized by blowing, a drier and a low-boiling thinner.

4. An improved varnish or enamel composition for producing wrinkled finishes comprising China wood oil and a wrinkle finish resin in proportions not less than about seven and not more than about seventeen gallons of oil per hundred pounds of the resin, at least the major portion of said oil being pre-oxidized by blowing, a drier, and a thinner the major portion of which boils off below about 325° F.

5. An improved method of producing wrinkled finishes, comprising applying a film containing China wood oil and a wrinkle finish resin in proportions not less than about seven and not more than about seventeen gallons of oil per hundred pounds of the resin, at least the major portion of said oil being pre-oxidized by blowing, a drier, and a thinner, and drying the applied film at a temperature upward of 150° F.

6. An improved method of producing wrinkled finishes, comprising applying a film containing China wood oil and a wrinkle finish resin in proportions not less than about seven and not more than about seventeen gallons of oil per hundred pounds of the resin, at least the major portion of said oil being pre-oxidized by blowing, a drier, and a low-boiling thinner and drying the applied film at a temperature upwards of 150° F.

7. An improved method of producing wrinkled finishes, comprising applying a film containing China wood oil and a wrinkled finish resin in proportions not less than about seven and not more than about seventeen gallons of oil per hundred pounds of the resin, at least the major portion of said oil being pre-oxidized by blowing, a drier, and a thinner, and drying the applied film at an elevated temperature.

In testimony whereof I affix my signature.

FRANK BRIAN ROOT.